United States Patent

[11] 3,604,502

| [72] | Inventors | James D. Morse;<br>Robert C. Verhaeghe, both of Racine, Wis. |
|---|---|---|
| [21] | Appl. No. | 855,151 |
| [22] | Filed | Sept. 4, 1969 |
| [45] | Patented | Sept. 14, 1971 |
| [73] | Assignee | Modine Manufacturing Company |

[54] COOLANT DEAERATION SYSTEM FOR INTERNAL COMBUSTION ENGINE COOLED BY CROSSFLOW RADIATOR
6 Claims, 6 Drawing Figs.

[52] U.S. Cl. .................................................. 165/51,
123/41.27, 123/41.54, 165/107, 165/110
[51] Int. Cl. ......................................................... F01p 11/02
[50] Field of Search ............................................. 123/41.54,
41.27; 165/107, 110, 111, 51

[56] References Cited
UNITED STATES PATENTS

| 1,311,529 | 7/1919 | Muir | 123/41.54 X |
| 1,658,934 | 2/1928 | Muir | 123/41.54 X |
| 3,254,707 | 6/1966 | Ferguson | 165/110 |
| 1,700,270 | 1/1929 | Muir | 123/41.54 X |
| 2,799,260 | 7/1957 | Butler | 123/41.54 |
| 3,455,377 | 7/1969 | Hayes | 123/41.54 X |
| 3,533,465 | 10/1970 | Bennett et al | 123/41.27 |

*Primary Examiner*—Albert W. Davis, Jr.
*Attorney*—Hofgren, Wegner, Allen, Stellman & McCord

ABSTRACT: A radiator apparatus as a part of the cooling system for an engine in which the apparatus comprises spaced vertical inlet and outlet tanks with a core having coolant tubes extending horizontally between the tanks (such radiator being termed a "crossflow radiator"), a first coolant conduit from the engine to a first of the tanks, a second coolant conduit from the second of the tanks to the engine so that the coolant flows from the engine to one tank or header and through the tubes to the other tank or header and then back to the engine, a coolant reserve and deaerating third vertical tank having a coolant liquid level when in use intermediate the top and bottom of this third tank, an inlet line for the coolant and entrapped gases from the engine to this third tank, a coolant outlet line for coolant substantially free of entrapped gases from the third tank to the engine and a check valve in the coolant inlet line permitting fluid flow only toward the third tank.

PATENTED SEP 14 1971   3,604,502

INVENTORS.
JAMES D MORSE
ROBERT C. VERHAEGHE
BY Hofgren, Wegner, Allen,
Stellman & McCord..
ATTORNEYS.

COOLANT DEAERATION SYSTEM FOR INTERNAL COMBUSTION ENGINE COOLED BY CROSSFLOW RADIATOR

In the cooling system for engines such as an internal combustion engine it is common practice to use a cooling radiator with spaced tanks or headers connected by a core which is customarily air cooled with the core including a plurality of tubes extending between the tanks for coolant flow from one tank to the other.

One of the factors which reduces the efficiency of such a radiator apparatus, by adversely affecting engine coolant pump flow, is entrapped air and other gases in the coolant system. The entrapped air and other gases also serve to reduce engine life.

This invention provides an efficient apparatus for collecting and venting these gases immediately by first conveying the gases to a third tank where reserve coolant and the gases are collected and the gases vented. The invention also insures that the coolant circuit of the engine, the radiator spaced tanks and core and the coolant lines between the engine and these tanks are always completely filled with coolant liquid even when the engine is stopped or when it is operating at very low speeds.

The invention will be described as illustrated in several embodiments as shown in the accompanying drawings. Of the drawings.

Figure 1:
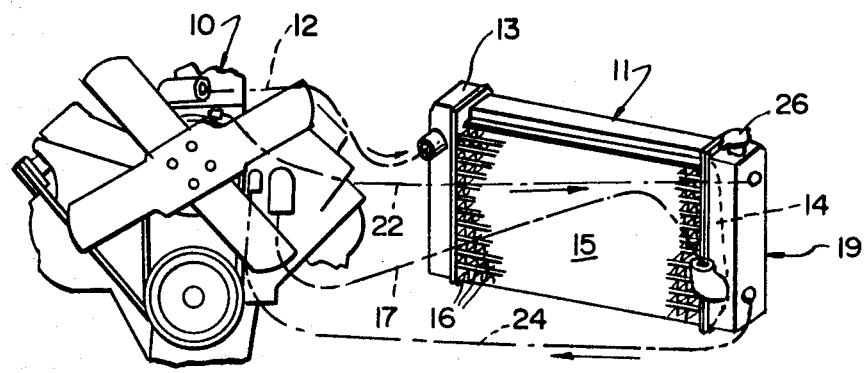
FIG. 1 is a semidiagrammatic view of an engine including a coolant system employing a crossflow radiator for the liquid coolant.

In the system of FIG. 1 there is included a customary internal combustion engine 10 and a crossflow radiator 11 in which liquid coolant flow from the engine into the radiator is indicated at 12. This coolant line 12 leads from the engine to a vertical inlet tank or header 13 while the opposite tank 14 of the radiator 11 functions as an outlet tank or header. The spaced vertical tanks 13 and 14 are interconnected by a customary radiator core 15 that comprises horizontal parallel coolant tubes 16 and cooling fins between adjacent tubes.

Coolant flowing from the engine 10 through the line 12 to the inlet tank 13 thereupon flows through the parallel tubes 16 into the outlet tank 14. From this outlet tank the coolant flows back to the engine through an outlet coolant line indicated at 17.

Figure 2:
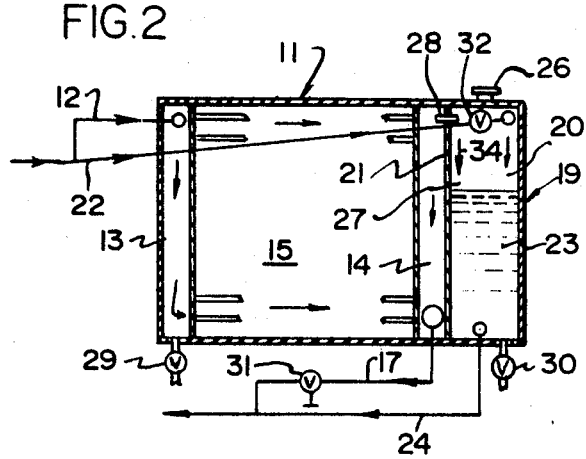
FIG. 2 is a semischematic view illustrating a first embodiment of a crossflow radiator apparatus embodying the invention.

A first embodiment of the radiator apparatus 11 is shown semischematically in FIG. 2. The vertical outlet tank 14 is part of a compartment 19 which also contains a coolant reserve and deaerating third tank 20 which is separated from the outlet tank 14 by a common vertical partition wall 21.

The top of the third tank 20 is supplied with mixed coolant and entrapped gases which may include air, combustion gases, previously dissolved gases or the like by means of an inlet line 22 that goes directly from the coolant section of the engine 10 to the top of the third tank 20. Reserve coolant 23 in the bottom of the third tank 20 is conveyed back to the coolant portion of the engine 10 by an outlet line 24. The fluid flow lines 22 and 24 to and from the third tank 20 have capacities such that the level of the liquid 23 in the tank 20 is ordinarily intermediate the top and bottom of this tank as indicated.

The third tank 20 is provided with a customary filler cap and pressure relief valve 26 for relieving excess pressure and for venting gases in the gas space 27 above the level of the liquid 23.

At the top of the dividing partition wall 21 there is provided a one-way valve means 28 device that operates to permit fluid flow only from the top of the outlet tank 14 into the third tank 20. Such a device can be an ordinary one-way check valve or a U-tube liquid trap. This device permits a very low volume flow of fluid from tank 14 to tank 20 and serves to reduce the time required for deaeration on start-up of the engine after an initial filling of the coolant system. In addition, it improves the efficiency of deaeration if there is any substantial air or combustion gas leakage into the cooling system during the operation of the engine.

In the embodiment of FIG. 2 there are provided the customary drain valves 29 and 30 at the bottom of the tanks 13 and 20. A customary engine temperature regulating thermostat 31 is depicted in coolant outlet line 17 from the outlet tank 14 only in order to indicate, that for what is known as an inlet regulating engine, the outlet line 24 must bypass the thermostat and be connected directly to engine pump suction.

Preferably the lines 22 and 24 to and from the coolant reserve and deaerating third tank 20 are bleed lines in that liquid flow through these is much less than through the coolant inlet and outlet lines 12 and 17. Thus, in certain embodiments, the main inlet and outlet lines 12 and 17 had a flow capacity of between 70–120 gallons of liquid per minute. In contrast, the lines 22 and 24 to and from the tank 20 had a flow capacity of only 3–120 gallons of liquid coolant per minute. Similarly, check valve 28 is sized to permit a relatively low flow, in the order of 1–2 gallons per minute.

One feature of the invention as illustrated in FIG. 2 is the provision of a check valve 32 in the inlet line 22 leading to the top of the third tank 20. This check valve and check valve 28 permit fluid flow only toward the tank 20 and not away from it. These check valves prevent liquid coolant in the cooling system from seeking its own level whenever the pump in the engine is no longer running to force liquid through the lines 12 and 22. This serves to maintain the entire cooling system completely full of liquid coolant even when the engine is not operating or operating at very low speeds because there is no way in which air can enter the cooling system. The result is that on shutdown or low speed operation the entire cooling system including the tanks 13 and 14, the tubes 16 therebetween and the liquid coolant lines to and from the radiator are kept full of liquid coolant. Then, upon starting up again, the coolant circulates free of air from the very beginning of start-up.

In the radiator structure 11 the level of the coolant 23 in the third tank 20 must be sufficiently above the entrance to the outlet line 24 that it will not suck in gases from the space 27 and liquid falling from the exit from the line 22 and from the exit of check valve 28, as indicated by the arrows 34, must not carry entrapped air down to this entrance as there must be time for the air to separate and pass back up into the space 27.

The result of this invention is that when the coolant system is partially full of air and other gases and the engine is first started up the air and gases are rapidly transferred to the third tank 20 and eventually vented through valve 26 into the ambient atmosphere. The entire cooling system including the connecting lines to the radiator 11 immediately become full of liquid coolant with substantially no gases present. The cooling system under these conditions is very efficient. Then, when the engine is shut down or is run at very low speed the liquid containing portions of the cooling system remain full of liquid.

Figure 3:
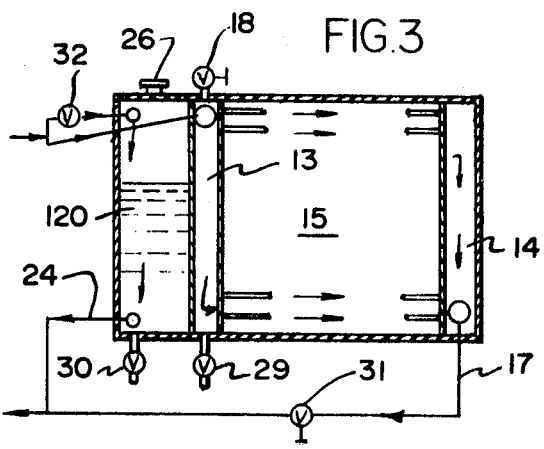
FIG. 3 is a view similar to FIG. 2 but illustrating a second embodiment.

The embodiment of FIG. 3 is very similar to that of FIG. 2 except here the third tank 120 is next to the inlet tank 13.

Figure 4:
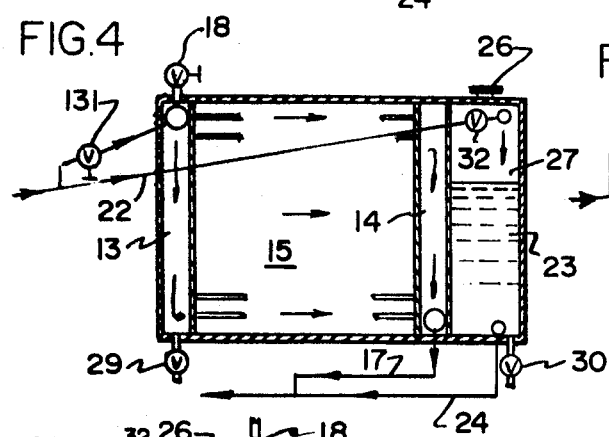
FIG. 4 is a view similar to FIG. 2 but illustrating a third embodiment.

Additionally, each of FIG. 3 and FIG. 4 does not have the check valve 28 as does FIG. 2, and each of FIG. 3 and FIG. 4 has a vent valve 18 located on top of tank 13 (it could be located as shown or on top of tank 14). This valve 18 is normally closed but it is opened for draining the coolant system in order to admit air as the liquid is drained and speed the draining process, and it must be open in filling a completely empty system in order to permit the escape of air and insure a full fill.

In the embodiment of FIG. 4 the difference over FIG. 2 is that the engine temperature regulating thermostat 131 is depicted in the coolant line to the inlet tank 13 in order to indicate, that for what is known as an outlet regulating engine, the inlet line 22 must bypass the thermostat and be connected directly to coolant exiting from the engine jacket.

Figure 5:
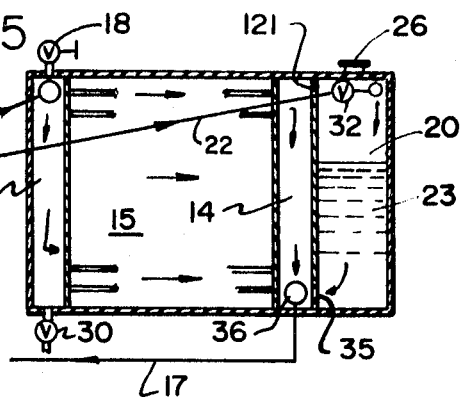
FIG. 5 is a view similar to FIG. 2 but illustrating a fourth embodiment.

FIG. 5 is similar to FIG. 4 except that in this embodiment there is provided a flow hole 35 through the partition wall 121 that separates the outlet tank 14 from the third tank 20. This flow hole 35 is located adjacent the radiator outlet 36 so that liquid 23 in the third tank 20 flows through this hole 35 directly into and through the outlet 36 to line 17.

Figure 6:
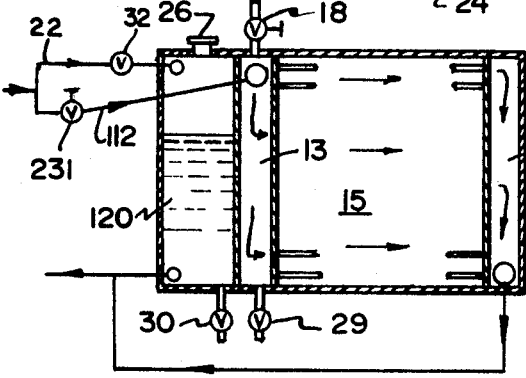
FIG. 6 is a view similar to FIG. 2 but illustrating a fifth embodiment.

The embodiment of FIG. 6 is very similar to that of FIG. 3 except this is also an outlet regulating engine in that the thermostat 231 is depicted in the coolant line 112 leading to the inlet tank 13.

The one-way valve 28 shown in FIG. 2, with communication through it from outlet tank 14 to coolant reserve and deaerating tank 20, permits flow only from the outlet tank to the coolant reserve and deaerating tank. This valve which also can be utilized in the other embodiments is not essential, but it makes the deaeration system more efficient by reducing the time required for deaeration after an initial filling of the cooling system and also a system including this valve can tolerate more air or combustion gas leakage before such leakage causes engine damage. However, if valve 28 is not utilized, then vent valve 18 must be included, in order to insure full fill.

Having described our invention as related to the embodiments shown in the accompanying drawings, it is our intention that the invention be not limited by any of the details of description, unless otherwise specified.

We claim:

1. In a cooling system for an engine, apparatus comprising: an engine; and inlet first radiator tank; an outlet second radiator tank spaced therefrom; a core with coolant tubes extending between said tanks; a first coolant conduit from said engine to said first tank; a second coolant conduit from said second tank to said engine; a coolant reserve and deaerating third tank having a coolant liquid level therein when in use intermediate the top and bottom of the third tank and having a pressure relief valve above the liquid level; an inlet line for coolant and gases from said engine to said third tank emptying into said third tank at a section thereof above said liquid level; a coolant outlet line for coolant substantially free of entrapped gases from said third tank to said engine; and a one-way flow device in said coolant inlet line permitting fluid flow only toward said third tank.

2. The apparatus of claim 1 wherein said outlet line is connected to said third tank adjacent the bottom thereof.

3. The apparatus of claim 1 wherein said coolant outlet line from said third tank comprises a flow opening between said outlet second tank and third tank adjacent said second coolant conduit from said second tank so that liquid from said third tank flows through said opening into and through said second coolant conduit.

4. The apparatus of claim 3 wherein said outlet second tank and said third tank are separated by a partition wall in which said flow opening is located, said flow opening and second coolant conduit both being located adjacent the bottoms of said second and third tanks and said partition wall.

5. In a cooling system for an engine, apparatus comprising: an engine; an inlet first radiator tank; an outlet second radiator tank spaced therefrom; a core with coolant tubes extending between said tanks; a first coolant conduit from said engine to said first tank; a second coolant conduit from said second tank to said engine; a coolant reserve and deaerating third tank having a coolant liquid level therein when in use intermediate the top and bottom of the third tank and having a pressure relief valve above the liquid level; an inlet line for coolant and gases from said engine to said third tank; a coolant outlet line for coolant substantially free of entrapped gases from said third tank to said engine; a one-way flow device in said coolant inlet line permitting fluid flow only toward said third tank; and flow means in the upper portion of said second tank between said second tank and said third tank for permitting fluid flow only toward said third tank.

6. The apparatus of claim 5 wherein said third tank is adjacent said second tank with a common wall between the third and second tanks.